United States Patent
Chon et al.

(10) Patent No.: US 9,598,291 B2
(45) Date of Patent: Mar. 21, 2017

(54) METHOD FOR MANUFACTURING LITHIUM HYDROXIDE AND METHOD USING SAME FOR MANUFACTURING LITHIUM CARBONATE

(71) Applicants: POSCO, Gyeongsangbuk-do (KR); RESEARCH INSTITUTE OF INDUSTRIAL SCIENCE & TECHNOLOGY, Gyeongsangbuk-do (KR); MPPLY CO., LTD., Daejeon (KR)

(72) Inventors: Uong Chon, Gyeongsangbuk-do (KR); Im Chang Lee, Daejeon (KR); Ki Young Kim, Gyeongsangbuk-do (KR); Gi-Chun Han, Chungcheongbuk-do (KR); Chang Ho Song, Incheon (KR); So Ra Jung, Gyeongsangbuk-do (KR)

(73) Assignees: POSCO, Pohang-si, Gyeongsangbuk-Do (KR); RESEARCH INSTITUTE OF INDUSTRIAL SCIENCE & TECHNOLOGY, Pohang-si, Gyeongsangbuk-Do (KR); MPPLY CO., LTD., Daejeon (KR)

( * ) Notice: Subject to any disclaimer, the term of this patent is extended or adjusted under 35 U.S.C. 154(b) by 137 days.

(21) Appl. No.: 14/389,860

(22) PCT Filed: Dec. 27, 2012

(86) PCT No.: PCT/KR2012/011607
§ 371 (c)(1),
(2) Date: Oct. 1, 2014

(87) PCT Pub. No.: WO2013/151227
PCT Pub. Date: Oct. 10, 2013

(65) Prior Publication Data
US 2015/0071837 A1  Mar. 12, 2015

(30) Foreign Application Priority Data

Apr. 5, 2012 (KR) .................. 10-2012-0035742

(51) Int. Cl.
*C22B 26/12* (2006.01)
*C01D 15/08* (2006.01)
(Continued)

(52) U.S. Cl.
CPC .............. *C01D 15/08* (2013.01); *B01J 4/002* (2013.01); *B01J 19/18* (2013.01); *C01D 15/02* (2013.01);
(Continued)

(58) Field of Classification Search
None
See application file for complete search history.

(56) References Cited

U.S. PATENT DOCUMENTS

| | | | |
|---|---|---|---|
| 2004/0151649 A1* | 8/2004 | Hemmer | C01B 25/45 423/306 |
| 2013/0129586 A1* | 5/2013 | Chon | C01B 25/30 423/179.5 |
| 2015/0013499 A1* | 1/2015 | Asano | C22B 3/0005 75/739 |

FOREIGN PATENT DOCUMENTS

| | | |
|---|---|---|
| CN | 1626443 | 6/2005 |
| JP | 07-002506 | 6/1993 |

(Continued)

OTHER PUBLICATIONS

JP2011-175767 Abstract Sep. 2011.*
(Continued)

*Primary Examiner* — Melvin C Mayes
*Assistant Examiner* — Colette Nguyen
(74) *Attorney, Agent, or Firm* — Finnegan, Henderson, Farabow, Garrett & Dunner, LLP (57) ABSTRACT

The present invention relates to a method of manufacturing lithium hydroxide and a method of manufacturing lithium carbonate using the same. The method of manufacturing lithium hydroxide includes: preparation of a lithium phosphate aqueous solution including lithium phosphate particles; addition of a phosphate anion precipitation agent to the lithium phosphate aqueous solution; and precipitating a sparingly soluble phosphate compound through a reaction of cations of the phosphate anion precipitation agent with anions of the lithium phosphate.

19 Claims, 3 Drawing Sheets

(51) Int. Cl.
  *C01D 15/02* (2006.01)
  *B01J 19/18* (2006.01)
  *B01J 4/00* (2006.01)

(52) U.S. Cl.
  CPC .. *B01J 2219/185* (2013.01); *B01J 2219/1946* (2013.01)

(56) References Cited

FOREIGN PATENT DOCUMENTS

| | | | |
|---|---|---|---|
| JP | 2004-25113 | | 1/2004 |
| JP | 2004-142986 | | 5/2004 |
| JP | 2004-359538 | * | 12/2004 |
| JP | 2007-122885 | | 5/2007 |
| JP | 2011-006275 | | 1/2011 |
| JP | 2011-168461 | * | 1/2011 |
| JP | 2011-168461 | | 9/2011 |
| KR | 10-2005-0021856 | | 3/2005 |
| KR | 10-2010-0066391 | * | 7/2010 |
| KR | 10-2011-0008227 | | 1/2011 |
| KR | 10-2012-0005980 | | 1/2012 |
| KR | 10-2012-0015659 | | 2/2012 |
| KR | 10-2012-0021675 | | 3/2012 |
| KR | 10-1126286 | | 3/2012 |
| WO | WO 2012/005545 A | | 1/2012 |

OTHER PUBLICATIONS

International Search Report from the Korean Intellectual Property Office for International Application No. PCT/KR2012/011607 mailed Apr. 15, 2013.

Chinese Doctoral Dissertations Full-text Database Engineering Science and Technology, The eighth in 2009, Jul. 16, 2009-Aug. 15, 2009, Chapter 1: Introduction (2009).

Hou Qinglie, et al. "Study on the process for preparing the fluorescent grade lithium phosphate", Inorganic Chemicals Industry, vol. 39, issue 3, pp. 47-49 (2007).

\* cited by examiner

METHOD FOR MANUFACTURING LITHIUM HYDROXIDE AND METHOD USING SAME FOR MANUFACTURING LITHIUM CARBONATE

TECHNICAL FIELD

A method of manufacturing lithium hydroxide and a method of manufacturing lithium carbonate using the same are disclosed.

BACKGROUND ART

Currently, lithium is being diversely applied to rechargeable battery, glass, ceramic, alloy, lubricant, and pharmaceutical industries. In particular, rechargeable lithium batteries have recently been receiving attention as a main power source for hybrid and electric cars. Further, the market for conventional compact batteries for cell phones and notebooks is expected to continually grow approximately one-hundred times larger.

In addition, lithium has been increasingly applied to electrical, chemical, and energy fields as well as hybrid and electric car industries due to a global movement towards more stringent environmental regulations. Thus, domestic and foreign demand for lithium is expected to be dramatically increased.

Lithium may be obtained from minerals, brine, seawater, and the like as a main source. Although mineral sources such as spodumene, petalite, and lepidolite contain lithium in a relatively large amount ranging from approximately 1 to 1.5%, the lithium is extracted through a complicated process such as floatation, calcination at a high temperature, grinding, acid mixing, extraction, purification, concentration, and precipitation. These processes are cost-ineffective because of high energy consumption and also cause severe environmental pollution due to the use of acids during the lithium extraction.

In addition, approximately $2.5 \times 10^{11}$ tons of lithium are reported to be dissolved in seawater, and is extracted by inserting an extraction device containing an absorbent into the seawater, selectively absorbing the lithium, and treating the absorbed lithium with acids. However, since the lithium is contained in a concentration of only 0.17 ppm in seawater, this technology of directly extracting lithium from seawater is extremely inefficient and uneconomical.

Due to the aforementioned disadvantages, lithium is currently extracted from brine produced from natural salt lakes, but salts such as Mg, Ca, B, Na, K, $SO_4$, as well as the lithium are also dissolved in the brine.

Further, lithium is contained in the brine in a concentration ranging from approximately 0.3 to 1.5 g/L, and is usually extracted in a form of lithium carbonate having solubility of about 13 g/L. Even assuming that lithium contained in the brine is completely converted to lithium carbonate, the lithium carbonate is contained in a concentration of 1.59 to 7.95 g/L in the brine (since $Li_2CO_3$ has a molecular weight of 74 and Li has an atomic weight of 7, the concentration of lithium carbonate can be estimated by multiplying the concentration of lithium by 5.3 (74÷14≈5.3)). However, since the concentration of the lithium carbonate is mostly lower than its solubility, the extracted lithium carbonate is re-dissolved and thus has an extremely low lithium recovery rate.

Conventionally, in order to extract lithium carbonate from lithium contained in brine, the brine was pumped from a natural salt lake, stored in an evaporation pond, and subsequently naturally evaporated outdoors over a long period of time, for instance, for several months to about one year, to concentrate the lithium by several tenfold. Then, the lithium carbonate was retrieved in an amount greater than or equal to its solubility after precipitating and removing the impurities such as magnesium, calcium, and boron therein.

For instance, Chinese Patent Pub. No. 1,626,443 describes a method of extracting lithium using brine containing concentrated lithium with a low amount of magnesium by evaporating and concentrating the brine under solar heat and repetitively electro-dialysizing it.

However, such a conventional method requires much time for evaporation and concentration of the brine and thus is unproductive, especially during rainy seasons. Further, the loss of lithium is unavoidable, when lithium is extracted along with other impurities in the form of a salt.

In addition, the extracted lithium requires an additional cost and much of energy in order to be converted into a practical form.

DISCLOSURE

Technical Problem

According to one embodiment of the present invention, a method of manufacturing lithium hydroxide and a method of manufacturing lithium carbonate using the same in order to obtain lithium hydroxide and lithium carbonate with a low cost are provided.

In addition, the method of manufacturing lithium hydroxide and the method of manufacturing lithium carbonate using the same may be environmentally friendly.

In accordance with one embodiment of the present invention, the methods need no evaporation and concentration of brine for a long period and may economically extract lithium with a high recovery rate, since the lithium dissolved in the brine is extracted using lithium phosphate with low solubility.

Technical Solution

In accordance with one embodiment of the present invention, a method of manufacturing a lithium hydroxide aqueous solution is provided, which includes: preparation of a lithium phosphate aqueous solution including lithium phosphate particles; addition of a phosphate anion precipitation agent to the lithium phosphate aqueous solution; and precipitation of a sparingly soluble phosphate compound by reacting cations of the phosphate anion precipitation agent with anions of the lithium phosphate.

The sparingly soluble phosphate compound may have lower solubility in water than the lithium phosphate.

The phosphate anion precipitation agent may be an oxide or hydroxide.

The phosphate anion precipitation agent may include cations of an alkaline-earth metal.

The phosphate anion precipitation agent may include cations of calcium, strontium, barium, radium, beryllium, magnesium, or a combination thereof.

The phosphate anion precipitation agent may be calcium hydroxide.

The sparingly soluble phosphate compound may be hydroxyapatite.

The lithium phosphate particles in the lithium phosphate aqueous solution may have a particle diameter ranging from about 0.01 μm to about 40 μm.

The lithium phosphate particles may have a surface area ranging from about 1.0 m²/g to about 100 m²/g.

The phosphate anion precipitation agent may be added in an amount of greater than or equal to about 1 equivalent based on the amount of the lithium phosphate in the lithium phosphate aqueous solution.

The lithium phosphate aqueous solution including lithium phosphate particles may have a lithium phosphate concentration of greater than or equal to about 0.01 The "%" may denote "wt %."

The method may further include separation of the precipitated sparingly soluble phosphate compound from a lithium hydroxide aqueous solution.

The method may further include concentrating the separated lithium hydroxide aqueous solution using reverse osmosis.

The concentrated lithium hydroxide aqueous solution may have a concentration of greater than or equal to about 9000 ppm.

The lithium phosphate may be obtained by adding a phosphorus-supplying material to a lithium-containing solution and extracting lithium dissolved therein into lithium phosphate.

The phosphorus-supplying material may include at least one selected from phosphorus, phosphoric acid, or phosphate.

The lithium-containing solution may be brine.

The method may further include separation of impurities including magnesium, boron, or calcium included in the brine before precipitating lithium dissolved therein into lithium phosphate by adding the phosphorus-supplying material to the brine.

Furthermore, the method may include obtaining lithium carbonate by reacting the separated lithium hydroxide aqueous solution with a carbonation gas or a carbonate-containing material.

Advantageous Effects

According to one embodiment of the present invention, are provided a method of manufacturing lithium hydroxide and a method of manufacturing lithium carbonate using the same with a low energy cost are provided. Specifically, the methods may decrease high establishment and maintenance costs (e.g., an amount of consumed electricity).

In addition, the method of manufacturing lithium hydroxide and the method of manufacturing lithium carbonate using the same may be environmentally friendly.

In accordance with an embodiment of the present invention, lithium dissolved in brine may be economically extracted with a high recovery rate by using lithium phosphate having low solubility without evaporating and concentrating the brine for a long period of time.

DESCRIPTION OF SYMBOLS

1: storage tank
2: carbonation reaction tank
3: droplet spray unit
4: high-pressure pump
5: droplet spray nozzle
6: carbonation gas storage tank
7: carbonation gas supplying unit
8: pressure measuring unit
9: carbonation gas supply valve
10: pressure control valve
11: safety valve
12: pH measuring unit
13: alkali solution input pump
14: alkali solution input nozzle
15: slurry agitating unit
16: level measuring unit
17: rotary dump valve
18: vacuum valve

MODE FOR INVENTION

Exemplary embodiments of the present invention will hereinafter be described in detail. However, these embodiments are only exemplary, and the present invention is not limited thereto.

According to one embodiment of the present invention, provided is a method of manufacturing a lithium hydroxide aqueous solution, which includes preparing a lithium phosphate aqueous solution including lithium phosphate particles, adding a phosphate anion precipitation agent to the lithium phosphate aqueous solution, and precipitating a sparingly soluble phosphate compound by reacting cations of the phosphate anion precipitation agent with anions of the lithium phosphate.

The lithium phosphate ($Li_3PO_4$) has solubility of about 0.39 g/L (at 20° C.) and is dissolved in water in a relatively small amount. Accordingly, the lithium phosphate may be converted into a material with high solubility such as lithium hydroxide and the like in a method of dissolving the lithium phosphate in acid and then adding an alkali such as NaOH and the like thereto, an electrolysis method, and the like.

According to one embodiment of the present invention, a lithium hydroxide aqueous solution may be prepared by adding a phosphate anion precipitation agent to a lithium phosphate aqueous solution including lithium phosphate particles and precipitating a sparingly soluble phosphate compound.

The sparingly soluble phosphate compound has lower solubility in water than the lithium phosphate.

The method of manufacturing a lithium hydroxide aqueous solution according to one embodiment of the present invention will be illustrated using calcium hydroxide as one example of the phosphate anion precipitation agent.

The method according to the embodiment of the present invention may be performed according to the following Reaction Scheme 1.

$3Li_3PO_4 + 5Ca(OH)_2 \rightarrow Ca_5(PO_4)_3 \cdot OH$ (precipitation) $+ 9Li^+ + 9OH^-$     [Reaction Scheme 1]

In other words, when lithium phosphate and calcium hydroxide are partly dissolved in water, $Ca^{2+}$ ions react with phosphate anions ($PO_4^{3-}$) produced from the lithium phosphate, precipitating a stable sparingly soluble phosphate compound (e.g., hydroxyapatite).

When the sparingly soluble phosphate compound is precipitated, $Li^+$ and $OH^-$ are left in the solution, obtaining a lithium hydroxide aqueous solution.

In addition, when the sparingly soluble phosphate compound keeps being precipitated, the $Li^+$ and $OH^-$ are increasingly concentrated in the solution, obtaining a highly concentrated lithium hydroxide aqueous solution.

According to the specific embodiment of the present invention, the lithium phosphate and the calcium hydroxide are sparingly soluble compounds respectively having solubility of 0.39 g/L and 1.73 g/L and are thus stable. However, since hydroxyapatite has very lower solubility and is more stable than the lithium phosphate and calcium hydroxide, the reaction scheme 1 may proceed as a forward reaction. The hydroxyapatite is known to have solubility that is very close to 0 g/L when its pH is increased.

The phosphate anion precipitation agent may be an oxide or hydroxide. More specifically, the phosphate anion precipitation agent may produce $OH^-$ and may simultaneously be bonded with phosphate anions produced from the lithium phosphate and produce a sparingly soluble phosphate compound.

For example, the phosphate anion precipitation agent may include cations of an alkaline-earth metal.

For example, the phosphate anion precipitation agent may include cations of calcium, strontium, barium, radium, beryllium, magnesium, or a combination thereof, but is not limited thereto.

For example, the phosphate anion precipitation agent may include $Ca(OH)_2$, $Mg(OH)_2$, and the like. In addition, the phosphate anion precipitation agent may include CaO and the like. The CaO may be obtained by heating $CaCO_3$. When water is added to the CaO, $Ca(OH)_2$ may be produced.

When the phosphate anion precipitation agent is calcium hydroxide, the sparingly soluble phosphate compound may be hydroxyapatite.

When the obtained hydroxyapatite is treated with sulfuric acid, gypsum ($5CaSO_4.2H_2O$) is precipitated, recovering phosphoric acid ($H_3PO_4$).

The phosphoric acid may be reused to obtain lithium phosphate of the present invention. Accordingly, the method is environmentally friendly and economical.

The lithium phosphate particles in the lithium phosphate aqueous solution may have a particle diameter ranging from about 0.01 μm to about 40 μm. In addition, the lithium phosphate particles may have a surface area ranging from about 1.0 m$^2$/g to about 100 m$^2$/g. When the lithium phosphate particles satisfy the ranges, the sparingly soluble lithium phosphate may be more effectively partly dissolved in water.

The phosphate anion precipitation agent may be included in an amount of greater than or equal to about 1 equivalent based on the amount of the lithium phosphate in the lithium phosphate aqueous solution. Specifically, the phosphate anion precipitation agent may be included in an amount of greater than or equal to about 2 equivalents. The phosphate anion precipitation agent included within the range may be advantageous in terms of reaction speed.

In addition, the method of manufacturing a lithium hydroxide aqueous solution may be performed at room temperature. Specifically, the method may be performed at a temperature of greater than or equal to about 20° C., about 30° C., about 50° C., or about 90° C. When the temperature becomes higher, reaction efficiency may be improved.

In this specification, "room temperature" denotes a temperature not being changed by external energy and thus may be various depending on time and space.

The lithium phosphate aqueous solution including lithium phosphate particles may have a lithium phosphate concentration of greater than or equal to about 0.01%. When the lithium phosphate concentration is within the range, lithium hydroxide may be more efficiently manufactured. The "%" may denote "wt %".

The method may further include separation of a precipitated sparingly soluble phosphate compound from the lithium hydroxide aqueous solution.

The separated lithium hydroxide aqueous solution may be concentrated through reverse osmosis. The separated lithium hydroxide aqueous solution in general may have a concentration of about 5000 ppm. However, the lithium hydroxide aqueous solution may be more concentrated in order to be converted into lithium carbonate.

The reverse osmosis is one of various concentration methods, but the present invention is not limited thereto.

The concentrated lithium hydroxide aqueous solution may have a concentration of greater than or equal to 9000 ppm. When the concentrated lithium hydroxide aqueous solution has a concentration within the range, the lithium hydroxide aqueous solution may be easily converted into lithium carbonate as aforementioned.

The lithium phosphate may be obtained by adding a phosphorus-supplying material to a lithium-containing solution to extract lithium dissolved therein into lithium phosphate.

As described above, lithium carbonate ($Li_2CO_3$) has solubility of approximately 13 g/L and thus may be dissolved in a relatively large amount in the water. Accordingly, lithium is difficult to extract from a lithium-containing solution such as brine, because the lithium is dissolved in an extremely small concentration of 0.5 g/L to 1.5 g/L (corresponding to 2.65 to 7.95 g/L when converted into lithium carbonate). Even if the lithium carbonate is produced by adding sodium carbonate to the lithium-containing solution, most of the lithium carbonate is re-dissolved.

On the other hand, since lithium phosphate ($Li_3PO_4$) has very much lower solubility of about 0.39 g/L than the lithium carbonate, lithium dissolved in a concentration ranging from about 0.5 to about 1.5 g/L (corresponding to an amount of about 2.75 to about 16.5 g/L when converted into lithium phosphate) may be easily extracted into solid lithium phosphate by adding a phosphorous-supplying material to the lithium-containing solution.

The extraction of lithium as lithium phosphate from the lithium-containing solution (e.g., brine) is based on insolubility of the lithium phosphate.

Then, a method of manufacturing lithium hydroxide by adding a phosphate anion precipitation agent (e.g., calcium hydroxide) to a lithium phosphate aqueous solution to precipitate a sparingly soluble phosphate compound (e.g., hydroxyapatite) is performed by using a more stable sparingly soluble phosphate compound than the sparingly soluble lithium phosphate.

In other words, this method is based on the property of lithium phosphate that it is sparingly soluble but simultaneously is partly dissolved in water.

The lithium-containing solution may have a lithium concentration of 0.1 g/L or more. More specifically, the concentration may be 0.2 g/L or more, or 0.5 g/L or more. A concentration of 60 g/L or more, however, may not be economical because a great amount of cost and time is required for the high-enrichment of lithium.

The phosphorous supplying material selected from the group consisting of phosphorous, phosphoric acid, phosphate, and a mixture thereof is added to the lithium-containing solution to produce lithium phosphate. In addition, in order for the lithium phosphate to be extracted in a solid state without being re-dissolved, the concentration (dissolution concentration in the lithium-containing solution) should be 0.39 g/L or greater.

However, when the phosphorus-supplying material is a compound changing pH of a lithium-containing solution (e.g., phosphoric acid), pH of the lithium-containing solution becomes lower and may re-dissolve the extracted lithium phosphate. Accordingly, the redissolution of the lithium phosphate may be prevented by using hydroxide ions with the phosphorus-supplying material.

The phosphate may be potassium phosphate, sodium phosphate, ammonium phosphate (for example, the ammonium phosphate may be $(NR_4)_3PO_4$, wherein R is independently hydrogen, deuterium, or a substituted or unsubstituted C1 to C10 alkyl group), and the like.

More specifically, the phosphate may be, for example, mono-potassium phosphate, di-potassium phosphate, tri-potassium phosphate, mono-sodium phosphate, di-sodium phosphate, tri-sodium phosphate, aluminum phosphate, zinc phosphate, poly-ammonium phosphate, sodium-hexa-meta-phosphate, mono-calcium phosphate, di-calcium phosphate, and tri-calcium-phosphate, but is not limited thereto.

The phosphorous supplying material may be water-soluble. In case the phosphorous supplying material is water-soluble, its reaction with lithium contained in the lithium bearing solution may easily occur.

The extracted lithium phosphate may be extracted by filtering the lithium-bearing solution.

The method of economical and efficient extraction of lithium from the lithium-containing solution by adding a phosphorous supplying material to the solution to precipitate lithium phosphate from the dissolved lithium may be performed at room temperature or above. More specifically, the step may be performed at 20° C. or above, 30° C. or above, 50° C. or above, or 90° C. or above.

The method may further include separation of impurities including magnesium, boron, or calcium in the brine, before adding a phosphorus-supplying material to the brine to extract lithium dissolved therein into lithium phosphate.

The separation of impurities including magnesium, boron, or calcium in the brine may be performed by adjusting pH and sequentially separating magnesium, boron, and calcium.

Specifically, the magnesium may be produced into magnesium hydroxide by adding negative hydroxide ions (e.g., NaOH) to a lithium-containing brine including Mg, B, and Ca.

Herein, the hydroxide negative ions (e.g., NaOH) may maintain pH of the brine in a range of 8.5 to 10.5 and cause boron (e.g., boron ions) to be absorbed in the magnesium hydroxide, co-precipitating the magnesium and boron.

The precipitated magnesium hydroxide absorbing boron from the brine may be separated from the brine through filtration, obtaining both magnesium and boron and leaving a filtrated solution.

After removing the magnesium and boron, hydroxide negative ions or carbonate negative ions (e.g., NaOH or a carbonate either singularly or as a mixture thereof) is added to the remaining filtrate to maintain pH of the filtrate in a range of greater than or equal to about 12 and precipitate calcium.

Herein, either precipitation of calcium hydroxide or calcium carbonate may be determined by either use of negative hydroxide ions or negative carbonate ions.

On the other hand, the impurities may be carbonated and removed.

For example, calcium cations in the lithium-containing solution are reacted with carbonation gas and may be separated into calcium carbonate.

The separation of the calcium cations in the lithium-containing solution into calcium carbonate through a reaction with carbonation gas may be performed at pH ranging from 5 to 8.5. When the pH is in the range, the calcium ions in the lithium-containing solution may be selectively extracted into carbonate.

When the pH is greater than about 8.5, magnesium hydroxide is produced, failing in selectively separating calcium ions. In addition, when the pH is smaller than about 5, calcium carbonate is not produced.

The method may further include reaction of the magnesium cations in the lithium-containing solution with carbonation gas and separation of the magnesium cations into magnesium carbonate.

The magnesium carbonate may be a magnesium hydrate, and specifically, $MgCO_3.3H_2O$.

The separation of magnesium carbonate by reacting the magnesium cations in the lithium-containing solution with carbonation gas may be performed at pH ranging from about 5 to about 12.

When the pH is within the range, the magnesium ions in the lithium-containing solution may be selectively extracted into carbonate. When the pH is greater than about 12, a lot of alkali is unnecessarily and is inefficiently consumed.

The method of extracting calcium or magnesium into a carbonate form by reacting calcium ions or magnesium ions in the lithium-containing solution with carbonation gas may be appropriate for mass production. In addition, this method may be effectively applied to a consecutive process.

The separated lithium hydroxide aqueous solution is reacted with carbonation gas or a carbonate-containing material, obtaining lithium carbonate.

Herein, the extracted lithium carbonate is filtered from the hydroxide lithium aqueous solution and then sometimes additionally cleaned to increase purity.

In fact, lithium carbonate having high purity of greater than or equal to 99.99% may be obtained by reacting the hydroxide lithium aqueous solution concentrated through the electrolysis with $CO_2$ gas.

The carbonation for forming carbonate may be performed using the following consecutive carbonation device.

Figure 1:
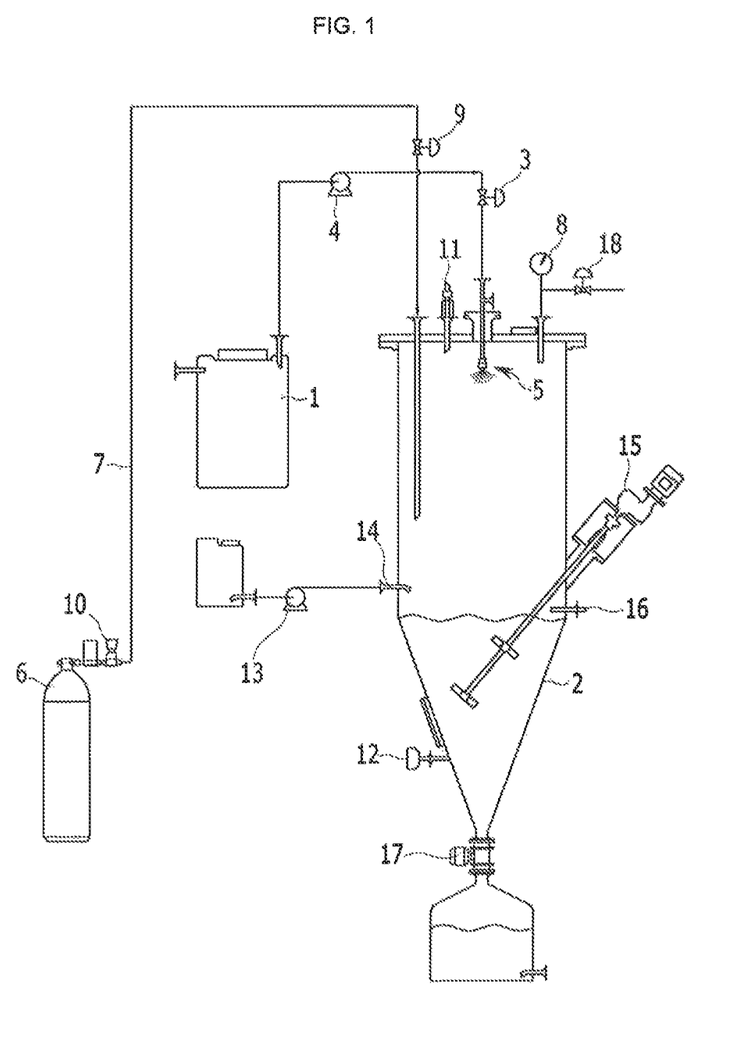
FIG. 1 is a schematic view showing overall structure of a carbonation device according to one embodiment of the present invention.

FIG. 1 is a schematic diagram showing an overall structure of a carbonation device according to one embodiment of the present invention.

Hereinafter, the carbonation device is illustrated, referring to FIG. 1.

According to one embodiment of the present invention, the carbonation device includes a storage tank 1 storing and supplying a solution for carbonation. The storage tank 1 is connected to a droplet spray unit 3 mounted in a carbonation reaction tank 2 and a pipe for transporting the solution.

The droplet spray unit 3 consists of a high-pressure pump 4 and a droplet spray nozzle 5. Specifically, a bottom part of the droplet spray nozzle 5 may be protruded from the top inside part of the carbonation reaction tank 2.

Herein, there may be more than one droplet spray nozzle 5 depending on the amount of the solution for treatment. When a plurality of the droplet spray nozzles 5 are mounted, the droplet spray nozzles 5 may be adjusted to respectively have different droplet dispersion angles, so that the droplets dispersed from the droplet spray nozzles 5 may not interfere with one another or contact the wall of the tank, increasing efficiency of a carbonation reaction.

In addition, the droplet spray unit 3 includes the high-pressure pump 4 and the droplet spray nozzle 5. The pressure of the high-pressure pump 4 and the diameter of the droplet spray nozzle 5 may be controlled to change the particle diameter of the droplets in a range of about 80 to about 200 μm. The particle diameter of the droplets may be changed to control the carbonation reaction.

The carbonation reaction tank 2 may be equipped with a carbonation gas supplying unit 7. Specifically, the carbonation gas supplying unit 7 is mounted on the top of the carbonation reaction tank 2.

The carbonation gas supplying unit 7 may consist of a pressure measuring unit 8 for measuring carbonation gas pressure inside the carbonation reaction tank 2, a carbonation gas supply valve 9, and a pressure control valve 10 for releasing a surplus pressure in the carbonation reaction tank 2 to adjust a pressure therein.

The pressure measuring unit 8 is for measuring carbonation gas pressure inside the tank and running the carbonation gas supply valve 9 and the pressure control valve 10. Accordingly, a pressure-measuring sensor of the pressure measuring unit 8 is positioned in the center of the carbonation reaction tank 2 apart from the droplet spray nozzle 5 to minimize interference due to pressure of the droplets.

The carbonation gas supply valve 9 is a device that automatically supplies carbonation gas from a carbonation gas storage tank 6 to the carbonation reaction tank 2 with a predetermined pressure. When carbonation gas in the carbonation reaction tank 2 is consumed due to a carbonation reaction and decreases a pressure therein, the carbonation gas supply valve 9 receives a signal from the pressure measuring unit 8 and automatically supplies as much carbonation gas as is consumed.

The carbonation gas supply valve 9 may set a carbonation gas pressure inside the carbonation reaction tank 2 in a range of a top pressure to 10 bar, a top pressure to 8 bar, a top pressure to 5 bar, or a top pressure to 3 bar.

The pressure control valve 10 receives a signal from the pressure measuring unit 8 and automatically runs and releases surplus pressure when the carbonation reaction tank 2 has a higher pressure than a predetermined carbonation gas pressure, resultantly controlling pressure in the carbonation reaction tank 2.

In addition, the carbonation device may include a safety valve 11 for rapidly removing excessive pressure in the tank.

The safety valve 11 automatically works and rapidly releases pressure for safety when the carbonation reaction tank 2 has a higher pressure than a predetermined pressure due to a malfunction of the carbonation device.

The carbonation reaction tank 2 may be safely operated under a pressure of greater than or equal to about 10 bar.

In addition, the droplets freely drop inside the carbonation reaction tank 2. Herein, the carbonation device may have a height of at least greater than or equal to about 3 meters such that the droplets may freely drop.

In addition, the carbonation reaction tank 2 may have a diameter of at least greater than or equal to 1 meter to prevent the droplets from contacting the wall thereof during the free dropping of the droplets.

Further, the carbonation reaction tank 2 may be made of PVC, PE, or a concrete structure with high strength to prevent corrosion due to brine and the like.

When a metal such as stainless steel is used, the wall surface of the tank where brine contacts the stainless steel that is weak against corrosion may be coated with TEFLON (tetrafluoroethylene), urethane, or the like.

The alkali solution supply device may include a pH measuring unit 12 measuring pH inside the carbonation reaction tank 2; an alkali solution input pump 13 supplying the carbonation reaction tank 2 with an alkali solution depending on the pH measured by the pH measuring unit 12; and an alkali solution input nozzle 14 connected to the alkali solution input pump 13 and supplying the carbonation reaction tank 2 with the alkali solution.

The alkali solution may specifically be a NaOH solution.

The pH measuring unit 12 may automatically measure pH of a reaction slurry and operate the alkali solution input pump 13 using the measured signal.

Accordingly, the alkali solution may be supplied to the reaction slurry to have a desired pH through the alkali solution input nozzle 14.

Then, the alkali solution may be agitated with the slurry using a slurry agitating unit 15 to promote the reaction.

In addition, the carbonation reaction tank 2 may include a level measuring unit 16 for drawing out the reaction slurry and a withdrawer for drawing out the slurry from inside of the carbonation reaction tank.

The withdrawer for drawing out the slurry inside the carbonation reaction tank may include a rotary dump valve 17.

The level measuring unit 16 may automatically measure the level of slurry built up in the carbonation reaction tank 2 when the carbonation reaction is complete and then send a signal to automatically operate the rotary dump valve 17.

The rotary dump valve 17 consecutively and automatically releases the slurry from the carbonation reaction tank 2 based on the slurry level information received from the level measuring unit 16 to maintain a predetermined slurry level.

The rotary dump valve 17 may maintain air-tightness during the operation to minimize a pressure change in the carbonation reaction tank 2.

The slurry agitating unit 15 may prevent the extracted carbonate from being precipitated and built up in the carbonation reaction tank 2, thus hindering operation of the rotary dump valve 17.

On the carbonation reaction tank 2, a vacuum valve 18 is mounted and connected to a vacuum pump.

Hereinafter, operation of a carbonation device having the aforementioned structure is illustrated as follows.

First of all, the vacuum valve 18 is opened and the vacuum pump is operated, removing the air remaining in the carbonation reaction tank 2.

When the air in the carbonation reaction tank 2 is sufficiently removed, the vacuum valve is closed, and the carbonation gas supply valve 9 is opened to supply carbonation gas to the carbonation reaction tank.

When a carbonation gas pressure inside the carbonation reaction tank 2 reaches a predetermined level, the carbonation gas supply valve 9 is closed, and the droplet spray unit 3 is operated to disperse droplets having a predetermined particle diameter through the droplet spray nozzle 5 into the tank 2.

For example, the dispersed droplets freely drop due to gravity inside the carbonation reaction tank 2, and carbonation gas that is excessively charged inside the tank is dissolved in the droplets and forms carbonate ions ($CO_3^{2-}$). The carbonate ions ($CO_3^{2-}$) react with cations for carbonation in the droplets and precipitate a carbonate.

Herein, the carbonation reaction may become efficient and maximized by adjusting the particle diameter of the droplets and thus the specific surface area of the droplets contacting carbonation gas, controlling the dropping speed of the droplets, and thus a reaction time and regulating pressure of the carbonation gas, and thus controlling dissolution speed of the carbonation gas.

The carbonation reaction consumes carbonation gas charged in the carbonation reaction tank 2 and reduces pressure in the tank 2.

When the carbonation gas pressure is reduced, the pressure measuring unit 8 senses the reduction and operates the carbonation gas supply valve 9 and the pressure control valve 10 to automatically maintain a predetermined carbonation gas pressure in the carbonation reaction tank 2.

On the other hand, when a solution including a large amount of cations for carbonation dissolved therein is carbonated, more carbonation gas is dissolved in the solution. When the carbonation gas is dissolved in a large amount, pH of the solution may drop to less than or equal to about 4 at most.

Herein, the dissolved carbonation gas exists as bicarbonate ions ($HCO_3^{1-}$). In general, a compound produced through combination of the bicarbonate ions with cations has high solubility and thus is not well extracted.

When this solution is released to the outside with normal pressure, the oversaturated carbonation gas is rapidly released, sharply deteriorating carbonation efficiency.

Accordingly, the bicarbonate ions ($HCO_3^{1-}$) are changed into carbonate ions ($CO_3^{2-}$) and carbonate is precipitated by increasing pH of the solution including carbonation gas dissolved therein inside a carbonation reaction tank having a pressure when the carbonation reaction is complete.

Specifically, pH of the solution in the carbonation reaction tank 2 is automatically measured using the pH measuring unit 12, and the measured pH signal operates the alkali solution input pump 13.

The alkali solution input pump 13 may inject an alkali solution through the alkali solution input nozzle 14 into the bottom solution in the carbonation reaction tank 2, until the bottom solution is adjusted to have a predetermined pH.

The slurry agitating unit 15 may play a role of rapidly agitating the alkali solution with the slurry.

On the other hand, as droplets continually drop from the top to the slurry complete with a carbonation reaction in the carbonation reaction tank 2, the level of the slurry is increased. When the level of the slurry reaches a predetermined level, the level measuring unit 16 senses the reaching of the predetermined level and automatically operates the rotary dump valve 17 and consecutively releases the slurry out of the carbonation reaction tank 2.

Herein, the slurry agitating unit 15 may prevent a carbonate precipitate in the slurry from settling and being built up in the bottom of the tank.

The present invention is further illustrated by the following examples, although the following examples relate to preferred embodiments and are not to be construed as limiting on the scope of the invention.

COMPARATIVE EXAMPLE 27.8 g of lithium phosphate is put in 1 L of distilled water heated up to 90° C. and the mixture is agitated, preparing a lithium phosphate slurry The lithium phosphate slurry is filtered according to a reaction time, and a filtrate obtained therefrom is used to measure a lithium concentration. The results are provided in FIG. 2.

Figure 2:
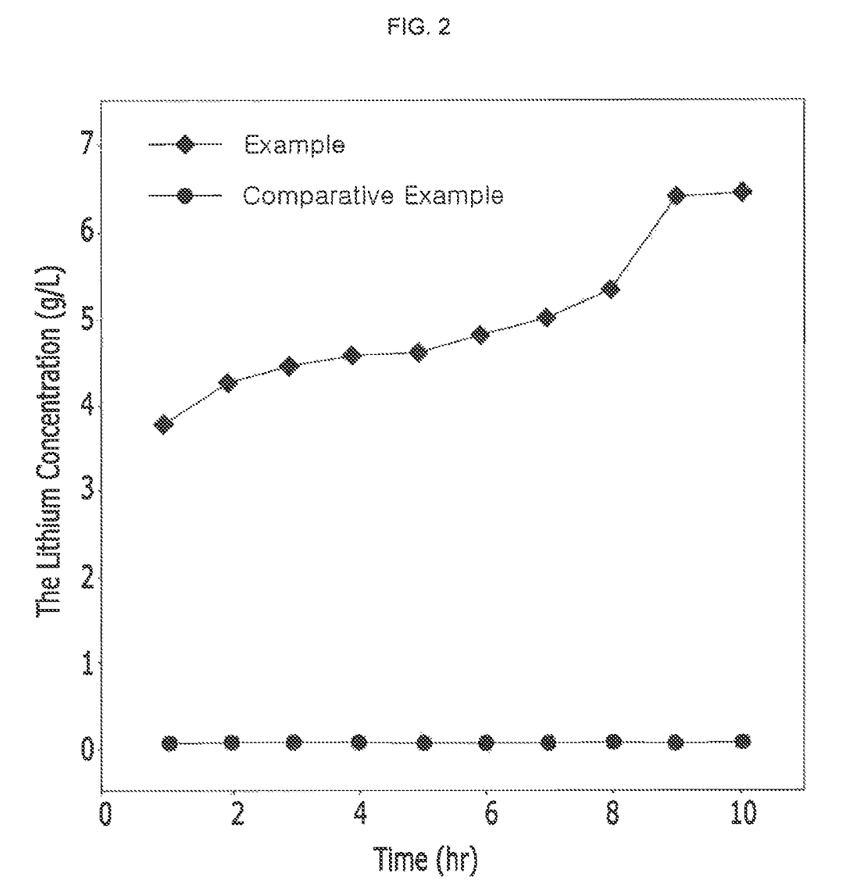
FIG. 2 shows lithium concentration measurement data of an example and a comparative example.

As shown in FIG. 2, the lithium concentration after 2 hours is 0.062 g/L. The lithium eluted up to 10 hours has almost the same concentration as aforementioned.

In other words, lithium phosphate is very stable in an aqueous solution and thus is a sparingly soluble material.

EXAMPLE 55.6 g of lithium phosphate was put in 1 L of distilled water heated up to 90° C. The mixture was agitated for 30 minutes. Then, calcium hydroxide was added in an amount of 59.27 g, corresponding to an equivalent of the lithium phosphate, to the agitated mixture.

Herein, the lithium phosphate has a particle diameter of 13 μm and a specific surface area of 54 m²/g.

The slurry prepared by the lithium phosphate and the calcium hydroxide was filtered according to reaction time, and a filtrate obtained therefrom was used to measure a lithium concentration. The results are provided in FIG. 2.

As shown in FIG. 2, the lithium concentration was 4.27 g/L after 2 hours and gradually increased up to 6.4 g/L after 10 hours. In other words, lithium elution from the lithium phosphate was identified.

Herein, the solution had pH of 10.5 after 2 hours. The pH increased up to 11.0 after 10 hours. Accordingly, the solution turned out to be a LiOH aqueous solution.

500 mL of the 6.4 g/L LiOH solution was heated to evaporate water and concentrate the volume down to half, and $CO_2$ (g) was injected therein at a rate of 0.5 L/min.

Figure 3:
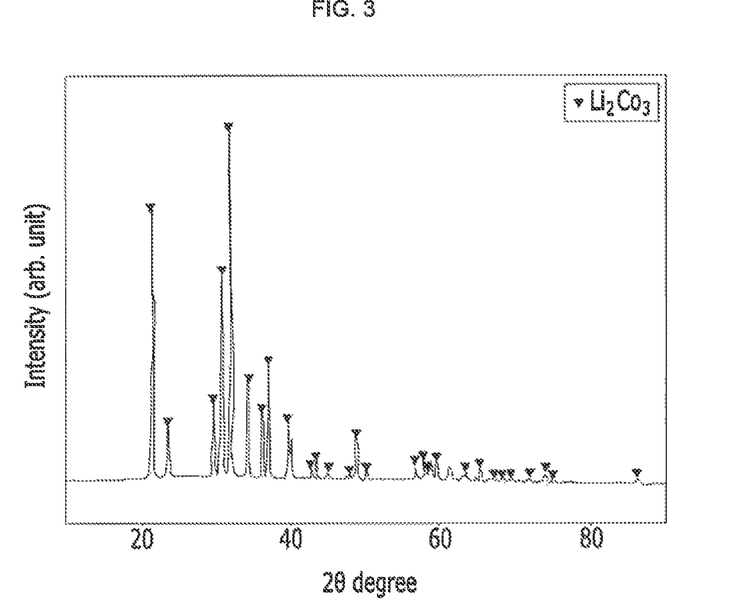
FIG. 3 shows XRD data of lithium carbonate according to an example.

Herein, a precipitate therein was lithium carbonate. FIG. 3 shows its XRD analysis result. In addition, impurities mainly included therein are provided in the following Table 1.

TABLE 1

| Purity of lithium carbonate | Impurity content (%) | | | | | | |
|---|---|---|---|---|---|---|---|
| (%) | Na | K | Mg | Ca | B | Cl | SO₄ |
| 99.9 | 0.05 | <0.0001 | 0.0002 | 0.0018 | 0.0007 | <0.001 | <0.001 |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A method of preparing a lithium hydroxide aqueous solution, comprising:
   preparing a lithium phosphate aqueous solution comprising lithium phosphate particles;
   adding a phosphate anion precipitation agent to the lithium phosphate aqueous solution; and
   precipitating a sparingly soluble phosphate compound through a reaction between cations of the phosphate anion precipitation agent and phosphate anions of the lithium phosphate.

2. The method of claim 1, wherein the sparingly soluble phosphate compound has lower solubility in water than the lithium phosphate.

3. The method of claim 1 or 2, wherein the phosphate anion precipitation agent is an oxide or hydroxide.

4. The method of claim 1 or 2, wherein the cation of the phosphate anion precipitation agent is an alkaline-earth metal.

5. The method of claim 1 or 2, wherein the cation of the phosphate anion precipitation agent is selected from calcium, strontium, barium, radium, beryllium, magnesium, or a combination thereof.

6. The method of claim 1 or 2, wherein the phosphate anion precipitation agent is calcium hydroxide.

7. The method of claim 1 or 2, wherein the sparingly soluble phosphate compound is hydroxyapatite.

8. The method of claim 1 or 2, wherein the lithium phosphate particles in the lithium phosphate aqueous solution have a particle diameter ranging from about 0.01 μm to about 40 μm.

9. The method of claim 1 or 2, wherein the lithium phosphate particles in the lithium phosphate aqueous solution have a surface area ranging from about 1.0 m$^2$/g to about 100 m$^2$/g.

10. The method of claim 1 or 2, wherein the phosphate anion precipitation agent is comprised in an amount of greater than or equal to about 1 equivalent based on the amount of lithium phosphate in the lithium phosphate aqueous solution.

11. The method of claim 1 or 2, wherein the lithium phosphate aqueous solution including the lithium phosphate particles has a lithium phosphate concentration of greater than or equal to about 0.01%.

12. The method of claim 1 or 2, which further comprises a separation of the precipitated sparingly soluble phosphate compound from the lithium hydroxide aqueous solution.

13. The method of claim 12, which further comprises concentrating the separated lithium hydroxide aqueous solution using reverse osmosis.

14. The method of claim 13, wherein the concentrated lithium hydroxide aqueous solution has a concentration of greater than or equal to about 9000 ppm.

15. The method of claim 1 or 2, wherein the lithium phosphate is obtained by putting a phosphorus supplying material in a lithium-containing solution and extracting lithium dissolved therein into lithium phosphate.

16. The method of claim 15, wherein the phosphorus supplying material is at least one selected from phosphorus, phosphoric acid, or phosphate.

17. The method of claim 15, wherein the lithium-containing solution is brine.

18. The method of claim 17, further comprising separation of impurities including at least one of magnesium, boron, or calcium in the brine before putting the phosphorus supplying material in the brine and extracting lithium dissolved therein into lithium phosphate.

19. The method of claim 12, which further comprises obtaining lithium carbonate by reacting the separated lithium hydroxide aqueous solution with a carbonation gas or a carbonate-containing material.

* * * * *